US005703786A

United States Patent [19]

Conkright

[11] Patent Number: 5,703,786

[45] Date of Patent: Dec. 30, 1997

[54] MEDICATION DISPENSING AND TIMING SYSTEM UTILIZING TIME REFERENCE MESSAGE

[75] Inventor: Gary W. Conkright, Naperville, Ill.

[73] Assignee: Profile Systems, LLC, Merrillville, Ind.

[21] Appl. No.: 514,990

[22] Filed: Aug. 14, 1995

[51] Int. Cl.[6] .................. G06F 19/00

[52] U.S. Cl. .................. 364/479.14; 221/9; 364/479.07; 364/479.11

[58] Field of Search .................. 364/479.11, 479.12, 364/479.13, 479.14, 479.01, 479.07, 401, 403, 569; 368/10; 221/2, 3, 9, 15; 395/202, 203, 228; 340/825.44; 379/106

[56] References Cited

U.S. PATENT DOCUMENTS

| | | | |
|---|---|---|---|
| 3,193,196 | 7/1965 | Merrill et al. | 235/98 |
| 3,206,062 | 9/1965 | Rappaport | 221/7 |
| 3,215,310 | 11/1965 | Hurst et al. | 221/7 |
| 3,266,664 | 8/1966 | Pearson et al. | 221/7 |
| 3,368,713 | 2/1968 | Hurst et al. | 221/7 |
| 3,558,004 | 1/1971 | Boyd, Jr. | 221/7 |
| 3,772,740 | 11/1973 | List | 221/7 |
| 3,823,844 | 7/1974 | Linkemer et al. | 221/13 |
| 3,837,139 | 9/1974 | Rosenberg | 53/59 R |
| 3,871,156 | 3/1975 | Koenig et al. | 53/59 R |
| 3,997,063 | 12/1976 | Adams et al. | 214/1 C |
| 4,013,192 | 3/1977 | Pillon | 221/7 |
| 4,018,358 | 4/1977 | Johnson et al. | 221/7 |
| 4,094,129 | 6/1978 | List | 53/54 |
| 4,111,332 | 9/1978 | Hurst et al. | 221/7 |
| 4,171,065 | 10/1979 | Hurst | 221/7 |
| 4,223,801 | 9/1980 | Carlson | 221/3 |
| 4,396,828 | 8/1983 | Dino et al. | 377/6 |
| 4,733,362 | 3/1988 | Haraguchi | 364/479 |
| 4,809,880 | 3/1989 | Stein | 221/204 |
| 4,835,372 | 5/1989 | Gombrich et al. | 235/375 |
| 4,869,394 | 9/1989 | Hurst | 221/7 |
| 4,870,799 | 10/1989 | Bergerioux et al. | 53/55 |
| 4,932,559 | 6/1990 | Stein | 221/7 |
| 4,942,544 | 7/1990 | McIntosh et al. | 364/569 |
| 4,953,745 | 9/1990 | Rowlett, Jr. | 221/5 |
| 4,984,709 | 1/1991 | Weinstein | 221/7 |
| 5,088,056 | 2/1992 | McIntosh et al. | 364/569 |
| 5,208,762 | 5/1993 | Charhut et al. | 364/478 |
| 5,329,459 | 7/1994 | Kaufman | 364/479.12 |
| 5,337,919 | 8/1994 | Spaulding et al. | 221/2 |
| 5,348,061 | 9/1994 | Riley et al. | 141/104 |
| 5,405,048 | 4/1995 | Rogers et al. | 221/11 |

*Primary Examiner*—Joseph Ruggiero
*Attorney, Agent, or Firm*—Lockwood, Alex, FitzGibbon & Cummings

[57] ABSTRACT

A medication dispensing and timing system includes a central monitoring computer which generates and sends a periodic time reference message over a two-way paging system to a plurality of patient communicators carried by respective patients. Each communicator includes sufficient memory to store the individual medication schedule of the particular patient, and processing circuitry which utilizes the time reference to interrogate the memory and generate a display and audible alarm to alert the patient when medication is to be taken. Upon the patient acknowledging the prompt, the communicator sends a reply message over the paging network to the central monitoring computer. Only in the event that a reply message is not received by the monitoring computer within a predetermined time period following the dispensing event, the computer initiates a procedure which includes an address-specific follow-up prompt message to the particular patient communicator. In the event no reply is received to this prompt message within a second predetermined period of time, appropriate telephone calls are made by the central monitoring center. The communicator may be equipped to electrically communicate with medication dispensing apparatus whereby the apparatus dispenses medication in response to a received prompting message. The dispensing apparatus may include a modem for communicating with the central monitoring computer to confirm actual dispensing when using, for example, a one-way paging system, and to provide a control path whereby the dispensing apparatus can be controlled from the monitoring computer in the event of a radio link failure.

20 Claims, 3 Drawing Sheets

MEDICATION DISPENSING AND TIMING SYSTEM UTILIZING TIME REFERENCE MESSAGE

BACKGROUND OF THE INVENTION

The present invention relates generally to medication dispensing systems, and more particularly to a medication dispensing system wherein the patient is prompted by a communicator device carried on his person, and acknowledges receipt of the prompt by sending a reply message to a central monitoring office. An emergency notification procedure is initiated in the event the reply message is not received within a predetermined period of time following the prompt.

In the dispensing of medication a primary problem has been recognized in prompting a patient to take a prescribed dose of medication at prescribed times. Patients are often preoccupied with other matters and may forget at the prescribed time. In the case of some geriatric patients, a loss of mental acuity may cause a lapse of memory or an extended period of forgetfulness, resulting in no medication or the wrong medication being taken.

Various apparatus have been developed for prompting a patient in bed to take medication, including medication dispensers incorporating a timer and programmable alarm and/or dispensing means operable from the timer.

Past devices for dispensing medications have included automated dispensers. An example of one such device is disclosed in U.S. Pat. No. 4,763,810, issued Aug. 16, 1988 which describes a motor-driven, tamper-proof automated medication dispenser. This automated dispenser has multiple compartments each holding a single dose of medication and linked to a programmable clock circuit. A motorized delivery system is controlled by the clock circuit to remove a doze of medication from specific compartments. This automated dispensing device further includes an audio and visual alarm which notifies the patient that a dose of medication is ready for taking. However, it does not have any means for monitoring whether the patient has actually removed the medication dose from the dispenser and further does not have any means of monitoring whether the patient has actually followed his/her medication schedule and taken the appropriate medication.

U.S. Pat. No. 4,223,801, issued Sep. 23, 1980, describes an automated medication dispenser which is equipped with an alarm for alerting a patient when medication is to be taken. A remote control automated alarm generates an alarm signal upon reception of a paging signal by the dispenser indicating that it is time to take medication, the signal being terminated when the medication is removed form the dispenser. Although this dispenser can be activated remotely by a third party, it only alerts the patient that it is time to take medication and has no provision for confirming that the patient has or has not taken the medication.

These prior art devices do not permit monitoring of a dispensing schedule at a remote location, nor do they remind a patient away from the dispenser that it is time to take medication. A need therefore exists for an automated medication dispensing system which alerts a patient in the course of his daily activities to take specific medication and which confirms that the patient has taken the medication, whereby the medication schedule of the patient can be monitored at a control monitoring office.

The present invention meets this need by providing a medication dispensing system in which a patient communicator including a radio frequency receiver receives coded time reference signals from a central monitoring office and compares these to the patient dispensing schedule stored in an internal memory to sound an alarm and provide a display when required by the medication dispensing schedule. The patient confirms the prompt by actuating a transmitter within the communicator, which generates a signal which is received at the monitoring office.

To reduce the number of prompts required, the system instead of sending a separate page to each communicator to prompt each medication event, sends universal periodic time reference pages to all communicators. Each communicator includes sufficient memory to store the medication schedule of the patient, and upon receipt of each time reference page determines from this memory whether medication is to be taken, and if so, the identification of the medication. This is displayed to the patient and an audible alarm is sounded.

The medication dispensing schedule is transferred into the communicator memory through a data port, which may be connected to a computer terminal at the pharmacy where the prescription is filled, or may be connected to the monitoring computer at the central monitoring facility, which in turn receives the medication schedule from the pharmacist.

In the event that a reply message is not received at the central monitoring computer within a predetermined period of time following a schedule medication event, a follow-up individually addressed prompt message is sent to the particular patient communicator. In the event that this message is not responded to, a supplemental communicator procedure is initiated where help is obtained by telephone.

Thus, the present invention includes a two-way communicator which is carried by the patient and which receives and decodes periodic time reference signals transmitted from a monitoring center to advise the patient that it is time to take medication in accordance with the preassigned schedule, and transmits a reply signal to the dispensing control center indicating that the prompt has been received. In the absence of a reply signal, the central monitoring facility sends a further prompt signal and initiates a supplemental procedure to secure help.

Also, the dispensing apparatus may be provided with a telephone modem whereby actual operation of the apparatus can be monitored at the central computer and whereby the apparatus can be controlled by the central computer in the event of paging system failure.

Accordingly, it is a general object of the present invention to provide a new and improved medication dispensing system.

It is a further object of the present invention to provide a wireless medication dispensing system responsive to periodic time reference signals in which a patient is alerted according to a prescribed medication dispensing schedule.

It is another object of the present invention to provide a medication dispensing system responsive to time reference signals generated by a central monitoring facility in which the patient is alerted in accordance with a predetermined medication schedule, and in which a confirmation that the patient has acknowledged the prompt is transmitted back to the monitoring office, and in which an alarm is sounded when the patient has not acknowledged the prompt within a predetermined period of time following the prompt.

It is a more specific object of the present invention to provide an improved medication dispensing system whereby commercially available two-way paging systems paged from a central monitoring office transmit coded time reference signals to individual paging receivers which have stored the medication schedule of their associated patient to provide a medication prompt to a patient so the patient takes medication in accordance with a pre-established dosage and timing schedule. The schedule may be conveyed to the monitoring office by a pharmacist or other entity licensed to dispense medication by means of a computer terminal and telephone line connection or the like. When the pager is activated by the patient, the dispenser generates a confirmation signal which is sent to the monitoring center to confirm that the prompt has been received by the patient. An alarm signal is generated by the monitoring center when an acknowledgment is not received from the pager within a predetermined time frame following receipt of a dispensing command signal.

SUMMARY OF THE INVENTION

The invention is directed to a medication dispensing system comprising central monitoring means for generating periodic time reference signals, at least a portion of the reference signals corresponding to the designated times of individual dosages of a predetermined patient medication schedule, a receiver associated with the patient for receiving the periodic time reference signal, a wireless communication network for conveying the time reference signals to the receiver, and the receiver including memory means responsive to the reference signal and containing said medication schedule for providing a prompt to the patient at the designated times of the dosages.

The invention is further directed to a medication dispensing system comprising central monitoring means for generating periodic time reference signals, at least a portion of the reference signals corresponding to the designated times of individual dosages of a predetermined patient medication schedule, a receiver associated with the patient for receiving the periodic time reference signal, a wireless communication network for conveying the time reference signals to the receiver, the receiver including memory means responsive to the reference signal for providing a prompt to the patient at the designated times of the dosages, the receiver further including transmitter means responsive to an external control effect for generating a reply signal acknowledging receipt of the prompt signal, an additional wireless communication network for conveying the reply signal to the central monitoring means, and the central monitoring means including alarm generating means responsive to the reply signal for initiating a predetermined follow-up procedure in the absence of the reply signal following the lapse of a predetermined time period following each of the dosage times.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
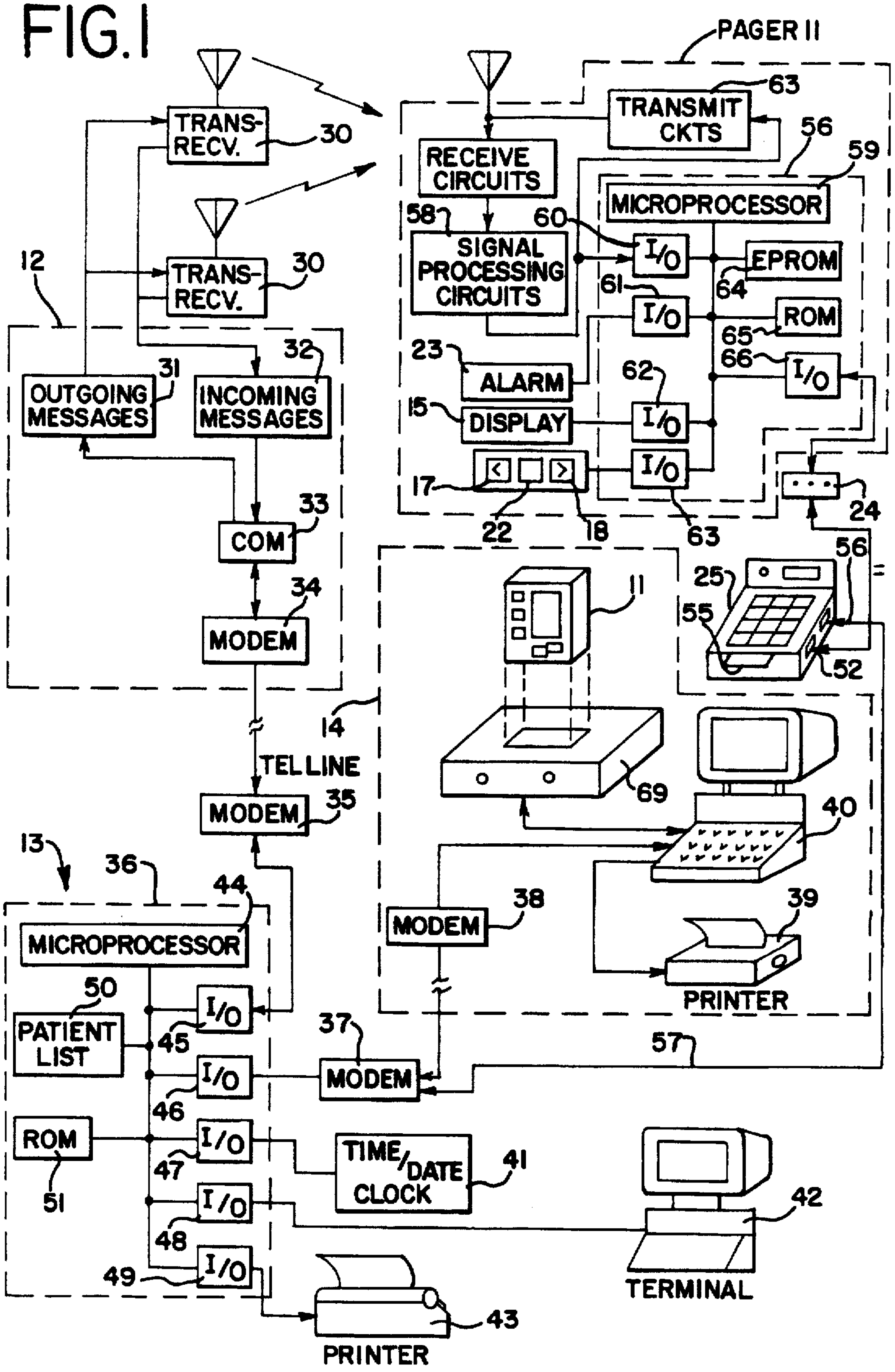
FIG. 1 is a simplified functional block diagram of a medication dispensing and timing system constructed in accordance with the invention.
Figure 2:
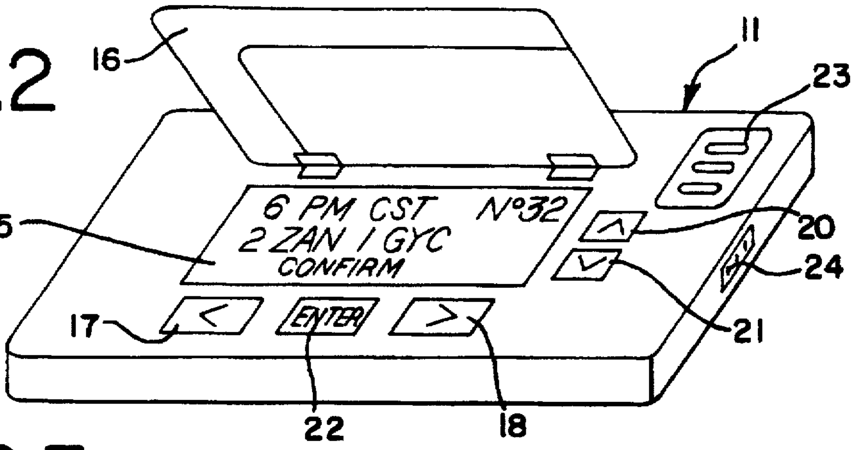
FIG. 2 is an enlarged perspective view of a patient communicator utilized in the medication dispensing and timing system of FIG. 1.

Referring to the Figures, and particularly to FIGS. 1 and 2, a medication dispensing and timing system 10 constructed in accordance with a preferred embodiment of the invention for prompting multiple patients having different medication schedules to take medication includes a plurality of two-way personal patient communicators 11 associated with each patient, a two-way wireless communication system 12, a single central monitoring facility 13 and a plurality of pharmacist stations 14.

Referring to FIG. 2, each patient communicator 11 is seen to include a display screen 15 on which an alpha-numeric message is displayed. Typically, this message may indicate the time and date of a prescribed medication event, the reference number of that event, and optional detail as to which medications are included in the event. A hinged cover 16 may be provided to cover screen 15 when the communicator 11 is not in use.

To allow for patient input the communicator may include a pair of left-right cursor keys 17 and 18 and a pair of up-down cursor keys 20 and 21. An enter key 22 functions as a confirmation key in accordance with indicia on display screen 15 to enable the patient to confirm receipt of a medication prompt on the screen. An alarm 23 may be incorporated in communicator 11 to audibly alert the patient of the need to take medication, and a data port 24 may be optionally provided to enable data to be exchanged between the communicator and another device, such as a medication dispensing apparatus 25 (shown in FIG. 1).

In a manner well known to the art, paging messages may be supplied to communicator 11 by a plurality of paging sites 30, each incorporating transmitting and receiving means whereby radio signals are transmitted to and received from communicator 11. These messages are typically conveyed to and from paging sites 30 by means of telephone lines or microwave links to a paging system control center 12. Within this center an outgoing message control circuit 31 controls the coding, timing and routing of outgoing messages, and an incoming message control circuit 32 controls the coding, timing and routing of incoming messages. Conventional techniques may be utilized within the paging network control system 12, including a client communication circuit 33 and modem 34, to establish communication over a telephone line or other communication link with the monitoring facility 13.

Within monitoring facility 13 messages to and from the paging network are processed by a modem 35, which communicates with a monitoring computer 36. Computer 36 also communicates with each pharmacist station 14 through a modem 37 within monitoring facility 13. Modem 37 is connected by a telephone line or equivalent communication link to a modem 38 within the pharmacist station and a conventional terminal 40. This terminal enables the pharmacist to retrieve and input information regarding a particular patient medication dispensing schedule, including the time of each patient reply.

Monitoring computer 36 also receives time and date information from a clock circuit 41. A terminal 42 is connected to monitoring computer 36 to enable an operator at the monitoring facility to selectively page a particular patient, to call up the medication dispensing history of a particular patient, or to review and/or modify the medication schedule of a particular patient. A printer 43 allows for the generation of written reports and documentation as required in the operation of the monitoring center.

Monitoring computer 36 may be conventional in structure and operation. In particular, the computer may include a conventional microprocessor 44, a plurality of input-output circuits 45–49, a memory 50 for storing patient medication dispensing schedules and other information, and a ROM 51 for storing the operating program and other required system information.

In operation, time reference messages addressed to all patient communicators 11 are periodically generated within monitoring computer 36 in response to time-indicative signals from clock 41.

The time reference messages generated by monitoring computer 36 are conveyed through modems 35 and 34, and communications manager circuit 33 to the outgoing message management circuit 31. From there the message is conveyed to paging sites 30 for transmission to all communicators 11. In the case of a two-way system as shown, the system 12 may be knowledgeable as to the whereabouts of the communicators and therefore may need only provide outgoing message at the paging sites 30 closest to the communicators.

Within each communicator 11 sufficient memory is provided to store the medication schedule of a patient. Receiver circuitry within the communicator receives the time reference signal and utilizes this to search the memory and, if medication is required, develops a prompt message for the patient.

Communicator 11 displays an alpha-numeric prompt message as shown. The audible alarm 23 is sounded to alert the patient to review the message. Upon reviewing the message, the patient depresses switch 22, causing the communicator to send a message to monitoring computer 36 by way of the paging system site 30, the incoming message control circuit 32, client message control circuit 33 and modems 34 and 35.

Monitoring computer 36 initiates an alert routine in the event that a reply message is not received from communicator 11 within a predetermined period of time $T_1$ following a time of the last medication event. For example, if $T_1$ is 10 minutes, and if medication is prescribed to be taken at 6:00 p.m. and no response has been received from communicator 11 by 6:10 p.m., monitoring computer 36 initiates another medication prompting message to communicator 11 for the purpose of reminding the patient that he still has not taken his prescribed medication. If a reply is not received in a further predetermined time period $T_2$, say two minutes, the operator at monitoring facility 13 is alerted through terminal 42 and printer 43 of a non-responsive condition. At this time, a telephone call may be made to 1) the patient, 2) the patient's care providing facility, 3 the patient's physician, 4) the pharmacist filling the prescription, or 5) another person designated to physically check up on the patient. These telephone calls are duly logged and if necessary emergency agencies can be contacted for further assistance.

The medication dispensing apparatus 25 may be optionally included in medication dispensing system 10. In this instance, to dispense medication from apparatus 25 it is necessary that the data port 24 of communicator 11 be connected with a data port 52 on apparatus 25. This connection having been made, a unit ID circuit 53 and cassette ID circuit 54 within dispenser 25 may require a match with unit and cassette ID numbers included in the medication prompting message. Only in the event of such a match, will dispenser 25 dispense medication to the patient. This precludes the patient from inadvertently taking dangerous multiple doses of medication by repeatedly actuating the dispensing apparatus.

Also, communicator 11 may be programmed to transmit a confirmation signal only upon medication dispenser 25 providing a signal at data port 24 which indicates that the medication has in fact been dispensed and removed from a hopper 55 of the dispenser.

The medication dispensing apparatus 25 may include a modem 56 for connection to a telephone line 57, which corrects the dispenser to modem 37 at the central monitoring facility. This communication link may be used for confirming actual operation of the apparatus to monitoring computer 36, or by computer 36 to control the dispensing apparatus in the event of failure of the paging system.

Patient communicator 11 may include a computer for processing and controlling the device. Conventional receiver circuits receive incoming messages, which are applied to signal processing circuits 58 to derive the time reference signals sent to all communicators and the messages individually-addressed to the particular communicator. The computer, which may be conventional in construction and operation, includes a microprocessor 59 and related input-output circuits 60–63 and 66, an EPROM 64 and a ROM 65. The medication schedule of the particular patient serviced by the communicator is contained in EPROM 64, and operating software and various constants are contained in ROM 65. Data port 24 provides for entering the medication schedule in EPROM 64.

Figure 3:
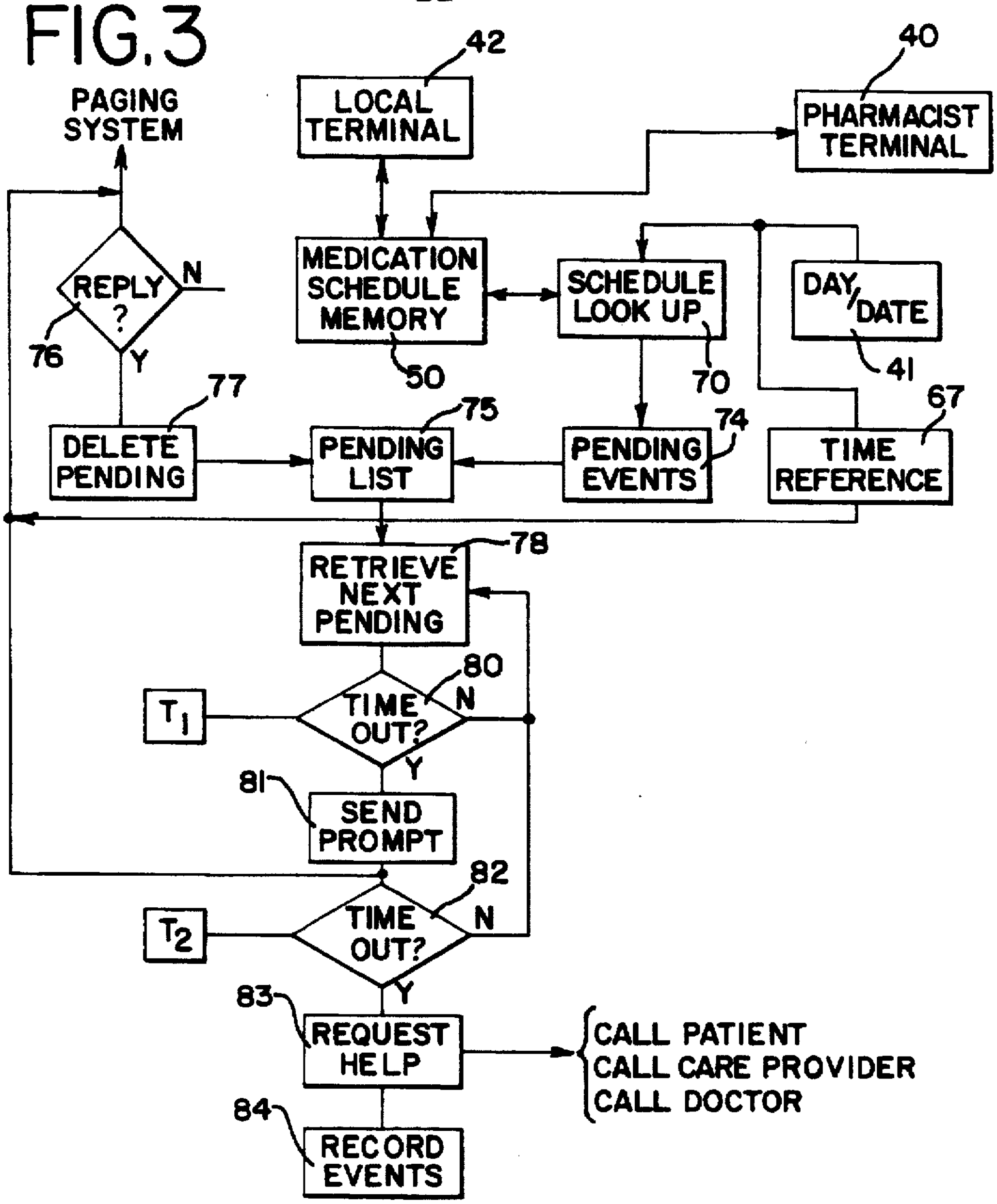
FIG. 3 is a simplified flow chart illustrating the operation of the central monitoring computer of the medication dispensing and timing system of FIG. 1.
Figure 4:
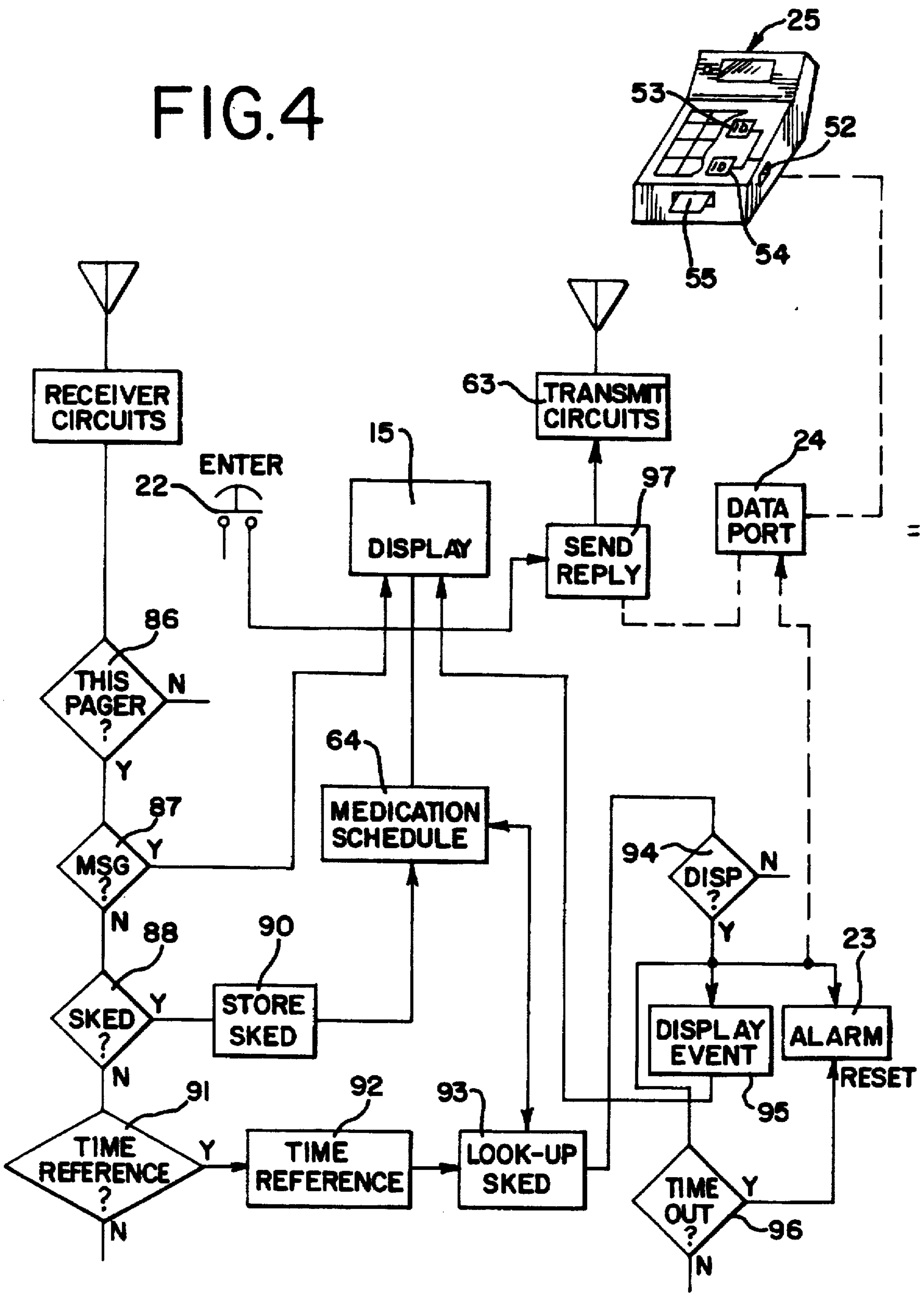
FIG. 4 is a simplified flow chart illustrating the operation of the patient communicator utilized in the medication dispensing and timing system of FIG. 1.

The operation of the medication dispensing system 10 is illustrated in FIGS. 3 and 4. There it is seen that the time and date output of clock circuit 4I is utilized at 67 to generate time reference messages for transmission to all system communicators 11. At the same time, this information is used in a table look-up operation 70 to determine whether a medication dispensing event is called for in any of the medication schedules stored within the system memory 50. Medication schedules stored within memory 50 may be monitored, modified or deleted at any time by inputs from either the local terminal 42 or any of the pharmacist terminals 40. In practice, appropriate safe guards may be provided to prevent a pharmacist from modifying or deleting selected patient medication schedules, including patient medication schedules with which he is not involved.

In the event the schedule look-up procedure 70 identifies one or more medication events to be accomplished at the then existing time and date, a list of pending events is formed at 74 for storage in a pending list memory 75. The process then continues with the next event.

In the event that a reply is received from a particular patient communicator 11, the reply is recognized at 76 and caused at 77 to delete that particular pending event from the pending list 75. At the same time, each medication event on pending list 75 is retrieved at 78 for possible further action. In the event that a period of time in excess of the predetermined time interval $T_1$ has elapsed since the pending event as determined at 80, a follow-up prompt is generated and sent at 81. In the event that the time period has not been exceeded, the next subsequent pending event is retreived at 78 for evaluation.

In the event that the follow-up prompt generated at 81 is not followed by a reply within a second predetermined time interval $T_2$ as determined at 72, a routine is begun at 83 which may include further follow-up prompt messages, a call to the patient, a call to the patient's care provider, a call to the patient's doctor, a call to the patient's pharmacist or a call to some designated individual. All such events are recorded at 84 within the monitoring computer of the system.

Referring to FIG. 4, within communicator 11 receiver circuits 57 derive digital messages which are analyzed at 86 and 87 to determine whether the incoming message is for the particular communicator. In the event that it is, the message is displayed on display screen 15 and the audible alarm 23 is sounded. Messages are also analyzed at 88 to determine whether they represent changes, which are stored at 90 within memory 64. If the message is determined at 91 to be a time reference message, at 92, a look-up procedure at 93 determined whether medication is to be taken. If so at 94, the event is displayed at 94 on display 15 and alarm 23 is activated. A time-out at 96 resets the alarm.

Acknowledgment of the prompting message is initiated by the patient actuating switch 22, which causes a reply message including the communicator address to be generated at 97 for transmission by transmitter circuitry 63 within the communicator to the medication dispensing and timing monitoring center 13. There, the reply message is utilized in the manner previously described to account for completion of the medication event.

In the event that the system is provided with medication dispenser 25, incoming messages are provided through data port 24 and completion of the dispensing operation is indicated through data port 24 for initiation of a reply message at 97.

Alternatively, in the event a one-way paging system is utilized, confirmation of receipt of the prompt signal, and optionally actual dispensing of the prescribed medication, may be accomplished by sending a suitable confirmation signal from dispenser 25 to monitoring computer 36 over telephone line 57.

It will be appreciated that various safe guards can be incorporated into the system. For example, a discrete code may be included in each prompt message for comparison to an identical discrete code stored within the communicator. Only in the event of a match of these codes will the message be recognized. Similarly, a discrete code may be required in each reply message to verify the authenticity of the reply signal. As previously developed, in the case of dispensing apparatus 25 it may be necessary that an electronic serial number 54 of the apparatus and the removable medication cassette utilized therein 55 match before the apparatus will respond to a medication prompt message or provide a reply indicative that dispensing has occurred. Furthermore, communications between the paging system 12 and the monitoring facility 13, and between the pharmacist station 14 and the monitoring facility 13 may be encrypted or otherwise protected by similar coding to confirm authenticity.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A dispensing system for dispensing medication to a patent in accordance with a predetermined medication schedule, comprising:
   - central monitoring means for generating periodic time reference signals, at least a portion of said reference signals corresponding to the designated times of individual dosages of a predetermined patient medication schedule;
   - memory means for storing the medication schedule;
   - a receiver associated with said patient for receiving said periodic time reference signals;
   - a wireless communication network for conveying said time reference signals to said receiver; and
   - said memory means being responsive to said reference signals for providing a prompt to the patient to take medication in accordance with said medication schedule.

2. A medication dispensing system as defined in claim 1 wherein said wireless communication network is a paging system.

3. A medication dispensing system as defined in claim 1 wherein said prompt comprises a visual display viewable by said patient.

4. A medication dispensing system as defined in claim 1 wherein said prompt comprises an audible alarm.

5. A medication dispensing system as defined in claim 1 wherein said central monitoring means includes a monitoring computer, and said system includes at least one pharmacist terminal located remote from said monitoring means for conveying a patient medication schedule to the monitoring means.

6. A medication dispensing system as defined in claim 5 wherein said dispenser includes communication means for communicating with said central monitoring means.

7. A medication dispensing system as defined in claim 6 wherein said dispenser includes means of producing a confirmation signal indicative of medication having been dispensed from said dispenser.

8. A medication dispensing system as defined in claim 5 wherein said dispenser includes memory means for keeping a detailed record of medication dispensed.

9. A medication dispensing system comprising:
   - central monitoring means for generating periodic time reference signals, at least a portion of said reference signals corresponding to the designated times of individual dosages of a predetermined patient medication schedule;
   - a receiver associated with said patient for receiving said periodic time reference signals;
   - a wireless communication network for conveying said time reference signals to said receiver;
   - said receiver including memory means responsive to said reference signals for providing a prompt signal to said patient at said designated times of said dosages;
   - said receiver further including transmitter means responsive to an external control effect for generating a reply signal acknowledging receipt of said prompt signal;
   - an additional wireless communication network for conveying said reply signal to said central monitoring means; and
   - said central monitoring means including alarm generating means responsive to said reply signal for initiating a predetermined follow-up procedure in the absence of said reply signal following the lapse of a predetermined time period following each of said dosage times.

10. A medication dispensing system as defined in claim 9 wherein said wireless communication network is a paging system, and said receiver is a uniquely addressed two-way paging receiver.

11. A medication dispensing system as defined in claim 9 wherein said external control effect comprises a patient-actuable switch.

12. A medication dispensing system as defined in claim 9 wherein said patient prompting means comprise an alphanumeric display viewable by the patient.

13. A medication dispensing system as defined in claim 9 wherein said patient prompting means comprise a patient-audible alarm.

14. A medication dispensing system as defined in claim 9 wherein said system includes a medication dispenser having communication means for communicating with said receiver and producing a confirmation signal indicative of the dispensing of a dose of medication, and said control effect is generated by said dispensing apparatus following receipt of said confirmation signal by said medication dispenser.

15. A medication dispensing system as defined in claim 14 wherein said dispenser includes memory means for receiving dispensing instructions from said receiver.

16. A medication dispensing system as defined in claim 14 wherein said information includes a unique address associated with said dispenser, and said dispenser is responsive only to signals conveying said unique address.

17. A medication dispensing system as defined in claim 9 wherein said central monitoring means includes a monitoring computer, and said system includes at least one pharmacist terminal located remote from said monitoring means for conveying a patient medication schedule to the monitoring means.

18. A medication dispensing system as defined in claim 14 wherein said central monitoring means includes a monitoring computer, and said system includes at least one pharmacist terminal located remote from said monitoring means for conveying a patient medication schedule to the monitoring means.

19. A medication dispensing system as defined in claim 18 wherein said pharmacist terminal further conveys a unique address associated with said dispenser to said central monitoring means.

20. A medical dispensing system as defined in claim 9 wherein said follow-up procedure includes sending a prompt message to said receiver, and said receiver includes a first address for receiving said time reference signal and a second address for receiving said prompt message.

* * * * *